Apr. 3, 1923.

E. V. COY.
VEHICLE THEFT PREVENTING DEVICE.
FILED AUG. 2, 1922.

1,450,411.

Inventor:
Earnest V. Coy,
By William L. Symons
his Att'y.

Patented Apr. 3, 1923.

1,450,411

UNITED STATES PATENT OFFICE.

EARNEST V. COY, OF EXCELSIOR SPRINGS, MISSOURI.

VEHICLE THEFT-PREVENTING DEVICE.

Application filed August 2, 1922. Serial No. 579,100.

*To all whom it may concern:*

Be it known that I, EARNEST V. COY, a citizen of the United States of America, residing at Excelsior Springs, in the county of Clay and State of Missouri, have invented certain new and useful Improvements in Vehicle Theft-Preventing Devices, of which the following is a specification.

My invention relates to devices for preventing the theft of vehicles.

An object of my invention is to provide means connected with the engine of an automobile which will give audible warning when the engine is operated by any unauthorized person.

With this and other objects in view, one embodiment of my invention is illustrated in the accompanying drawings, in which:—

Figure 1:
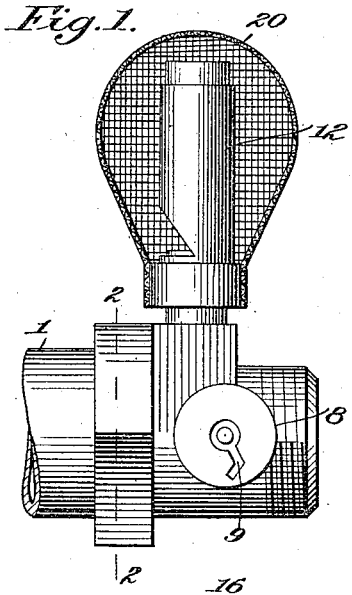
Figure 1 is a side elevation of my complete device looking toward the lock of the device, a part of the device being shown in section.
Figure 2:
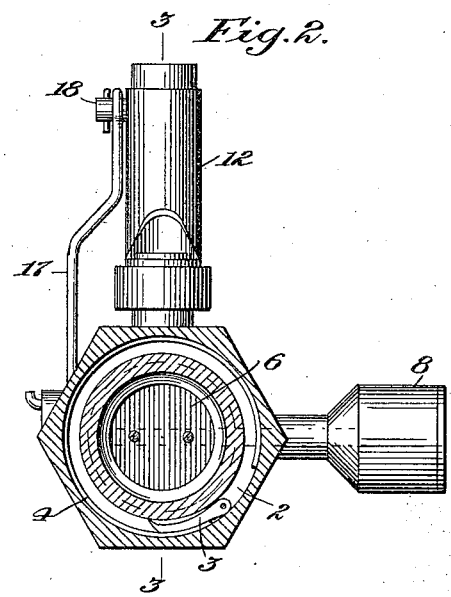
Figure 2 is a section on line 2—2 of Figure 1.

My device, which comprises a body member or nut having an opening through it with screw threads on both ends thereof, means to close the opening through this nut, a whistle attached to the nut which may be placed in operative and inoperative position, and other features, may be connected to the exhaust manifold 1 of an internal combustion engine. An exhaust pipe, not shown, of conventional form may be attached to the smaller end of the nut. The construction of the connection to the manifold prevents the removal of the device. A slot 2 is made midway the threaded part of the nut in which is pivoted a dog 3, one end of which is pushed upward by spring 4. This construction allows the device to be screwed on to the end of the manifold, but prevents its removal, for if an attempt is made to unscrew the nut, the end of the spring pressed dog will dig into the threads on the manifold.

The opening through the nut is closed by a damper 6, attached to a shaft 7 which is controlled by a lock 8 operated by a key through the key opening 9. The lock construction which controls the shaft may be of any desired form.

Figure 3:
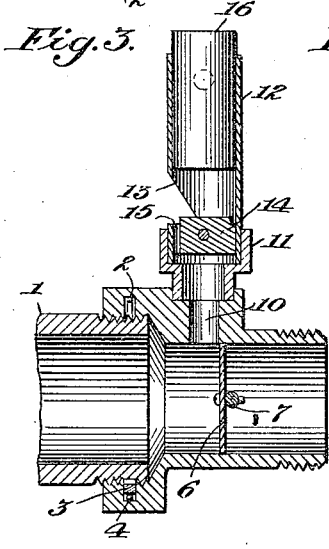
Figure 3 is a section on line 3—3 of Figure 2.
Figure 4:
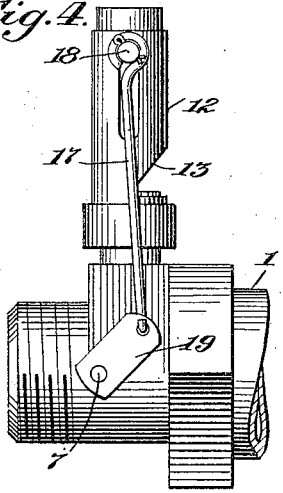
Figure 4 is a side elevation of a complete device with one part omitted, taken from the side opposite the side shown in Figure 1.
Figure 5:
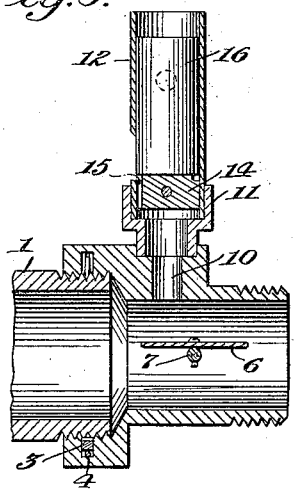
Figure 5 is a section on line 3—3 of Fig. 2 with the device in inoperative position.

Leading from the opening in the nut is an opening 10, which is placed so that when the damper is closed, the opening will connect with the opening to the manifold. Attached to the nut is a socket member 11 covering the opening 10, to which is fastened a whistle cylinder 12 having the usual whistle opening 13. A block 14 is fastened in the bottom of whistle cylinder to close the opening to the nut opening except at 15 which is the usual small opening of the size required to blow the whistle. The whistle is placed in operative position as shown in Figure 3, and in inoperative position as shown in Figure 5, by a piston 16 which is connected to a rod 17 by having the upper end thereof attached to a lug 18 which reciprocates in a slot in the whistle cylinder. The lower end of this rod is connected to an arm 19 which is fixed to the end of the shaft 7 which operates the damper.

The whistle part of my device may be covered by a dome 20 made of foraminous material attached by any suitable means as by welding to the socket 11.

The operation of my device will be readily understood from the above description and may be briefly stated as follows:—

While the engine is operated by the owner of the car, the damper and piston which are the moving parts of the device, will be in the position indicated in Figure 5. When the engine is stopped, the user of the car by means of a key will place the damper and piston in the position shown in Figure 3. Any attempt to use the engine when the theft-preventing device is in the position shown in Figure 3 will result in blowing the whistle, giving notice to the owner of the car. The device will continue to whistle as long as the engine runs, for it cannot be placed out of operative position except by operating the key controlled lock.

Having described my invention, what I claim and desire to protect by Letters Patent is:—

1. A device of the kind described comprising a body member, said body member having an opening extending through said member, means to lock said member to the exhaust manifold of an internal combustion engine, a shaft controlled damper in said opening adapted to close said opening, a whistle connected to said body member, the opening in said whistle extending into the body member opening between the damper and the opening into the exhaust manifold, a piston in said whistle, a connection between said piston and said shaft controlled damper and means to control said damper and said whistle piston to place said device in operative and inoperative position, said means comprising a lock.

2. A device of the kind described comprising a body member adapted to be attached to the exhaust manifold of an internal combustion engine, said body member having an opening extending through said member, means to lock said device to said exhaust manifold comprising an annular slot adjacent one end of said opening, a dog pivoted in said slot, and a spring in said slot adapted to press out of said slot the end of said dog, means to close said opening, said means being lock controlled, a whistle attached to said body member, said whistle being adapted to be placed in operative position by lock controlled means, and a cover for said whistle of foraminous material.

In testimony whereof I affix my signature.

EARNEST V. COY.